United States Patent [19]
Perkins et al.

[11] Patent Number: 5,715,014
[45] Date of Patent: Feb. 3, 1998

[54] CIRCUIT AND METHOD OF PROVIDING PARENTAL DISCRETIONARY CONTROL ON A PIP IC

[75] Inventors: Geoffrey W. Perkins, Chandler; Robert NMI DeFrancesco, Phoenix; Paul P. Tighe, Tempe, all of Ariz.

[73] Assignee: Motorola, Inc., Schaumburg, Ill.

[21] Appl. No.: 707,116

[22] Filed: Sep. 3, 1996

[51] Int. Cl.$^6$ ........................................ H04N 5/45
[52] U.S. Cl. ........................ 348/565; 348/568; 348/567
[58] Field of Search .................... 348/565, 567, 348/568, 566, 5.5; H04N 5/45, 5/445

[56] References Cited

U.S. PATENT DOCUMENTS

| | | | |
|---|---|---|---|
| 5,382,983 | 1/1995 | Kwoh | 348/716 |
| 5,528,304 | 6/1996 | Cherrick | 348/565 |

Primary Examiner—Sherrie Hsia
Attorney, Agent, or Firm—Robert D. Atkins

[57] ABSTRACT

An integrated circuit (22) processes baseband video signals to produce a picture-in-picture (PIP) channel for a video monitor (26). A discretionary control circuit (64) on the integrated circuit monitors parental discretionary control data on a predetermined horizontal line (21) of the baseband video signal. The discretionary control data is a value that represents the amount and degree of sex and violence in the presently viewed program. The parent or responsible party stores a threshold value in a television control circuit. The discretionary control circuit compares the discretionary control data to the threshold value. If the discretionary control data is less than the selectable threshold, then the PIP channel is displayed. If the discretionary control data is greater than the selectable threshold, then the PIP channel is blanked.

19 Claims, 4 Drawing Sheets

CIRCUIT AND METHOD OF PROVIDING PARENTAL DISCRETIONARY CONTROL ON A PIP IC

BACKGROUND OF THE INVENTION

The present invention relates in general to television circuits and, more particularly, to a circuit and method of providing discretionary control functions in a Picture-in-Picture integrated circuit.

Television circuits that receive wideband radio frequency (RF) signals and produce red/green/blue (RGB) analog signals for display on monitors are well known. A typical television video circuit includes a tuner that receives the RF signals from an antenna or cable port. The tuner selects a particular frequency of the RF signal representing a viewing channel. The selected channel frequency from the tuner is processed through an IF amplifier and detector that amplifies the selected channel and reduces its frequency to a baseband video signal. A National Television Standards Committee (NTSC) decoder receives the baseband video signal from Intermediate Frequency (IF) amplifier and detector and separates the RGB signals according to the NTSC format. A microprocessor controls the tuner, IF amplifier, and NTSC decoder.

Recent proposed changes in US federal regulations mandate a discretionary control feature, commonly called the "V-chip" function, in the television circuit. The V-chip function allows the parent or other responsible person discretionary control to block-out television programs that the parent deems inappropriate for young viewers. The V-chip function may be incorporated by one or more dedicated ICs or included in the microprocessor. The proposed discretionary control feature will be encoded and sent on line 21 of the 525 horizontal lines making up one picture screen. Each line 21 has a synchronizing clock burst followed by data. The line 21 data contains closed captioning information to display words on the television screen for the hearing impaired viewer. The line 21 data further includes discretionary control data as a value representing the level of sex and violence in the presently running program. The discretionary control data is feed into the microprocessor or V-chip IC. The parent pre-sets a discretionary threshold. If the discretionary control data is less than the discretionary threshold then the amount and degree of sex and violence in the presently running program is considered acceptable. The viewer is allowed to watch the program. If the discretionary control data is greater than the discretionary threshold then the amount and degree of sex and violence in the presently running program is considered unacceptable. The video signal is blanked out, or otherwise made unviewable.

A problem arises in television systems using Picture-in-Picture (PIP) features. A television with a PIP feature receives a main channel and a PIP channel, each coming from an antenna or cable port, or from external video such as a video cassette recorder (VCR). The television with PIP displays the main channel covering the entire screen. The PIP feature displays another channel compressed in size and superimposed over one quadrant of the main channel. For example, the main channel may display a full-length feature film while the PIP channel displays a sporting event in the lower left corner of the screen. It is desirable to have discretionary control over both the main channel and the PIP channel. Unfortunately, the discretionary control data is lost during the size compression of the PIP channel. Although additional dedicated integrated circuits could be added to perform the V-chip function on the incoming PIP channel, that would impose further cost and complexity on the television video processing system.

Hence, a need exists for parental discretionary control over both the main channel and the PIP channel without adding one or more dedicated integrated circuits that perform the V-chip function.

DETAILED DESCRIPTION OF THE PREFERRED EMBODIMENT

Figure 1:
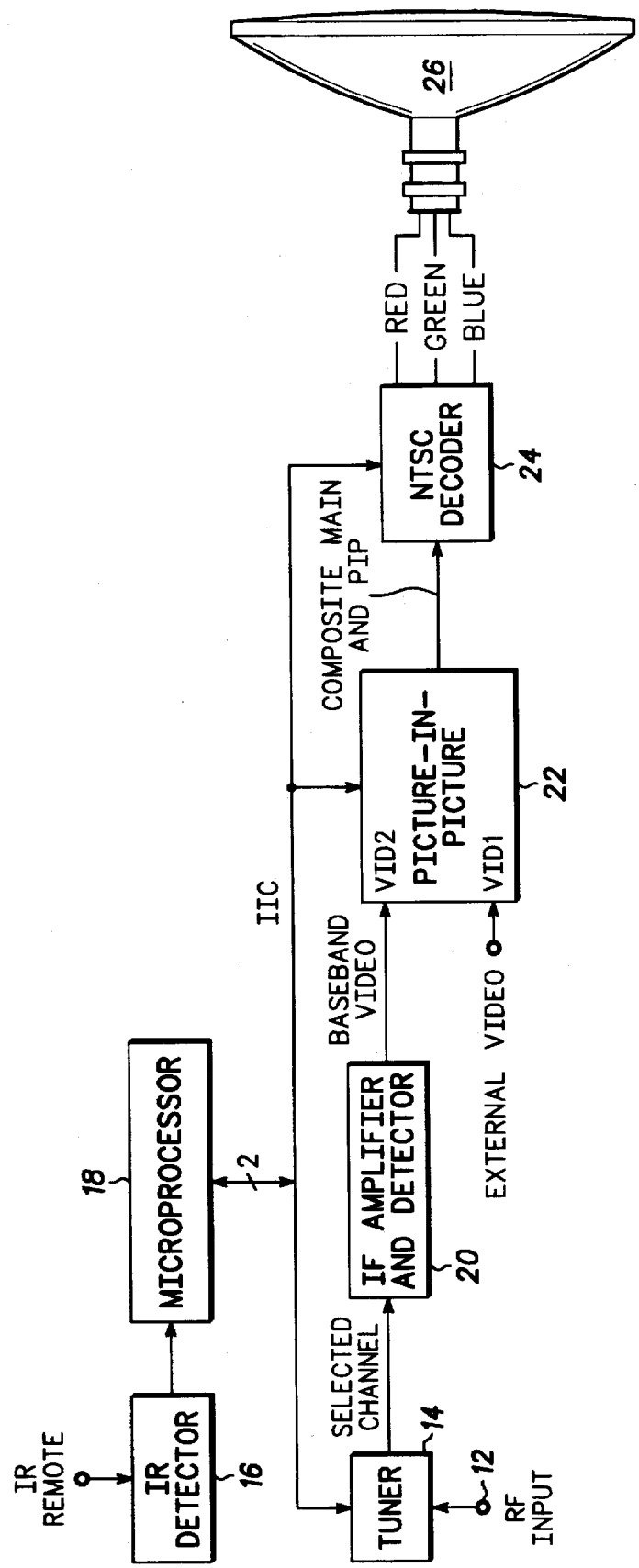
FIG. 1 is a block diagram illustrating a television system.

A television video processing system 10 is shown in FIG. 1 including an antenna or cable port 12 receiving a wideband RF input signal comprising several viewing channels at different predetermined frequencies. A tuner 14 receives the RF input signal and allows the viewer to select the desired channel frequency for viewing. An Infrared (IR) REMOTE input receives an IR signal from a remote control unit (not shown) operated by the viewer. IR detector 16 converts the IR signal to logic levels for microprocessor 18 which in turn controls tuner 14 over the Inter-Integrated Circuit (IIC) 2-wire bus for clock and data. For example, the viewer selects a channel by the remote control unit. Microprocessor 18 sends the appropriate command over the IIC bus so that tuner 14 selects that channel frequency from the RF input signal.

The SELECTED CHANNEL is processed through IF amplifier and detector 20 for amplification and to reduce the frequency of the selected video signal to baseband. IF amplifier and detector 20 provides a BASEBAND VIDEO signal to one input VID2 of Picture-in-Picture (PIP) 22. A second input VID1 of PIP 22 receives a baseband EXTERNAL VIDEO signal from, for example, a VCR or external camcorder jack. Alternately, the VID1 input can be another baseband viewing channel frequency selected from the received RF input signal. PIP 22 operates under control of microprocessor 18 over the IIC bus and selects one input to PIP as the main channel and the second input as the PIP channel. Within PIP 22, the PIP channel is processed through the parental discretionary control function, compressed, temporarily stored, and combined with the main channel as described in detail below. PIP 22 is implemented as an integrated circuit (IC) in television video processing system 10.

An NTSC decoder 24 receives COMPOSITE MAIN AND PIP channel video signal from PIP 22 and separates the RGB analog signals for video monitor 26 according to the NTSC format. Microprocessor 18 also controls IF amplifier and detector 20, and NTSC decoder 24 over the IIC bus as is known in the prior art.

As a feature of the present invention, the parental discretionary control function over the PIP channel, i.e. "V-chip" feature, is incorporated into the integrated circuit of PIP 22. With the "V-chip" function as part of the PIP integrated circuit, the parent can blank-out the PIP channel within PIP 22 and prevent young people from viewing undesirable programs. The parent can still blank-out the main channel through the microprocessor as described in the background.

The television system designer need not provide one or more additional "V-chip" ICs dedicated to the discretionary control function over the PIP channel since that feature is an integral part of PIP 22.

Figure 2:
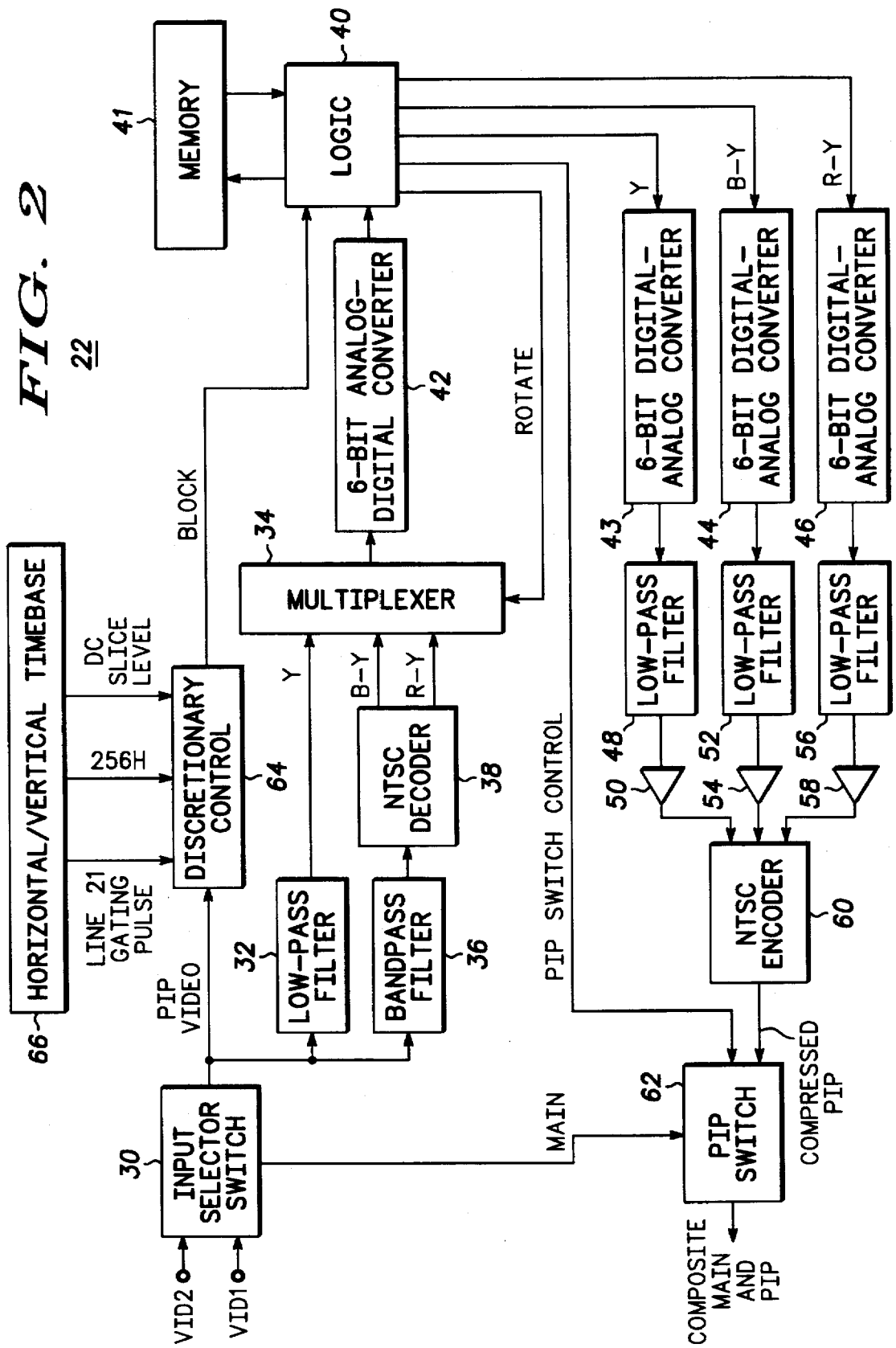
FIG. 2 is a block diagram of the PIP chip shown in FIG. 1.

Turning to FIG. 2, the PIP 22 integrated circuit is shown as a block diagram including analog input selector switch 30 having first and second inputs coupled to VID1 and VID2. The first output of selector switch 30 is the MAIN video channel and the second output of selector switch 30 is the PIP VIDEO channel. Input selector switch 30 selects either VID1 or VID2 as the MAIN channel and the PIP VIDEO channel, respectively. In other words, microprocessor 18 operates over the IIC bus to select one of VID1 and VID2 as the MAIN channel and the other as the PIP VIDEO channel. The PIP VIDEO channel is processed through low-pass filter 32 for providing the Y luminance signal. Low-pass filter 32 is a 6-pole Bessel filter having a 1.0 MHz corner frequency. The Y luminance signal contains black/white brightness information and has a wide bandwidth to show detail in the picture. The Y output of low-pass filter 32 is coupled to one input of multiplexer 34. The PIP channel is also processed through band-pass filter 36 for separating out the chroma information in a double sideband suppressed carrier (DSSC) format. Band-pass filter 36 is a 4-pole Bessel filter operating at 3.58 MHz ±200.0 KHz. The output of band-pass filter 36 is coupled to NTSC decoder 38 that reduces the DSSC chroma to baseband and separates out the B-Y chroma component and the R-Y chroma component. An implementation and operation of the NTSC decoder is well known to one of ordinary skill in the relevant art. The B-Y signal and R-Y signal are coupled to second and third inputs of multiplexer 34.

Multiplexer 34 selects the Y signal, B-Y signal, and R-Y signal on a rotating basis in response to a ROTATE control signal from logic 40. The rotation is typically Y, B-Y, Y, R-Y, Y, B-Y, Y, R-Y, in a repeating 4-2-2 pattern. Thus, the Y signal is sampled twice as often as the B-Y and R-Y signals. The output signal multiplexer 34 is digitized by 6-bit analog-digital converter (ADC) 42 and packed by logic 40 for storage in memory 41. The packing technique compresses the PIP image to a size less than the full television screen, typically one-ninth or one-sixteenth of the full screen size. The compression technique involves taking a weighted average of every three lines and making one line for the one-ninth of full-size PIP, or taking a weighted average of every four lines and making one line for the one-sixteenth of full-size PIP. The implementation and operation of the PIP compression algorithm is well known to one of ordinary skill in the relevant art. The compressed PIP image as digitized and sampled Y, B-Y, R-Y signals is stored in memory 41.

The compressed PIP image stored in memory 41 is addressed and retrieved through logic 40. The digitized Y signal is converted back to analog form by digital-analog converter (DAC) 43. The digitized B-Y signal is converted back to analog form by DAC 44. The digitized R-Y signal is converted back to analog form by DAC 46. The analog Y signal is processed through low-pass filter 48 and amplified by amplifier 50. The analog B-Y signal is processed through low-pass filter 52 and amplified by amplifier 54. The analog R-Y signal is processed through low-pass filter 56 and amplified by amplifier 58. Low-pass filters 48, 52, and 56 are 4-pole Bessel filters each with a 4.0 MHz corner frequency. The amplified Y, B-Y, R-Y signals are processed through NTSC encoder 60 to return the COMPRESSED PIP channel to NTSC format. The implementation and operation of the NTSC encoder is well known to one of ordinary skill in the relevant art.

PIP switch 62 synchronizes the COMPRESSED PIP channel from NTSC encoder 60 with the MAIN video channel from input selector switch 30 to superimpose the COMPRESSED PIP channel over the MAIN channel. PIP switch 62 is controlled by logic 40 to insert the COMPRESSED PIP channel into the MAIN channel. Logic 40 keeps track of the location of the COMPRESSED PIP channel within the MAIN channel. When the PIP SWITCH CONTROL signal is one logic state, the MAIN channel is routed through PIP switch 62. Logic 40 counts horizontal lines and switches the PIP SWITCH CONTROL signal to a second state during a portion of the line, i.e. over a predetermined number of horizontal clock pulses, where the COMPRESSED PIP channel should be positioned. When the PIP SWITCH CONTROL signal is in the second logic state, the COMPRESSED PIP channel is routed through PIP switch 62. The COMPOSITE MAIN AND PIP from PIP 22 is processed through NTSC decoder 24 to generate the RGB signals for video monitor 26. The PIP processing channel includes filters 32 and 36, NTSC decoder 38, multiplexer 34, ADC 42, logic 40, memory 41, DAC 43–46, filters 48–56, and NTSC encoder 60. All functions in PIP 22 are controlled by IIC bus, e.g. PIP position, PIP size, tint, saturation, border, blanking, etc., although not specifically shown in FIG. 2 to avoid confusing the drawing.

Another embodiment of the PIP 22 IC involves processing the Y, B-Y, R-Y signals directly without converting back and forth between NTSC format.

As a feature of the present invention, the PIP VIDEO from selector switch 30 is also processed through discretionary control 64 and horizontal-vertical timebase 66. The PIP VIDEO signal comprises a series of 525 lines of analog data representing the picture to be displayed and various timing and control information. Line 21 of the 525 lines includes data for closed captioning for the hearing impaired and discretionary control data. The format of line 21 is a clock burst operating at 32 times the horizontal line frequency followed by a series of high and low pulses. The pulses represent closed captioning and discretionary control data separated by headers or preambles. The discretionary control header identifies the data that follows as discretionary control data which is a value representing the degree and amount of sex and violence in the presently program. The format of the header and discretionary control data will be determined by federal regulation.

Discretionary control 64 provides the parent or responsible party the ability to blank-out the video signal containing inappropriate material. Discretionary control 64 is an integral part of the PIP 22 IC which saves the television system designer from having to place a dedicated V-chip IC on the system board to handle the PIP channel. Discretionary control 64 receives the PIP VIDEO signal, in particular the line 21 discretionary control data, from input selector switch 30. Discretionary control 64 extracts the line 21 discretionary control data from the PIP VIDEO and compares it to a pre-set discretionary threshold determined by the parent. If the discretionary control data is less than the discretionary threshold then the amount and degree of sex and violence in the presently running program is considered acceptable. The BLOCK signal is set to a first logic state, e.g. logic zero, so that logic 40 passes the compressed PIP image stored in memory 41 to DACs 43–46. PIP 22 processes the PIP channel and the viewer is allowed to watch the program. If the discretionary control data is greater than the discretionary threshold then the amount and degree of sex and violence in the presently running program is considered unacceptable. The BLOCK signal is set to a second logic state, e.g. logic one, so that logic 40 blocks the compressed PIP image stored in memory 41 from reaching DACs 43–46. For example, logic 40 may include a NOR logic gate (not shown) that blocks the compressed PIP image when the BLOCK signal is logic one by providing a fixed logic zero output to DACs 43–46. PIP 22 processes blank data which prevents viewers from seeing the PIP channel. Alternately, the BLOCK signal may control a multiplexer (not shown) that switches between passing the compressed PIP image and a solid color signal or pre-set pattern to DACs 43–46 that blanks-out or otherwise makes the PIP channel unviewable.

Discretionary control 64 also receives the line 21 gating pulse, 256H high frequency clock signal, and the DC SLICE LEVEL signal from horizontal-vertical timebase 66. The line 21 gating pulse is a logic signal that has one logic state, e.g. logic one, during the time line 21 is present in the PIP VIDEO signal and a second logic state, e.g. logic zero, otherwise. The line 21 gating pulse can easily be generated in horizontal-vertical timebase 66 by counting horizontal lines (horizontal sync pulses) after the vertical sync pulse (beginning of vertical at top of screen). The twenty-first count is the line 21 data whereby the line 21 gating pulse goes to logic one. The 256H clock signal runs at 256 times the horizontal line frequency, i.e. 256*15.734 KHz. A phase lock loop (PLL) can generate the 256H clock phase-locked to the horizontal line frequency as is well known. The DC SLICE LEVEL signal is black level of the PIP VIDEO signal, i.e. the mid-way amplitude in the analog signal (50 IRE NTSC format). The DC SLICE LEVEL signal is a reference for a data slicer to convert the line 21 data to logic levels.

Figure 3:
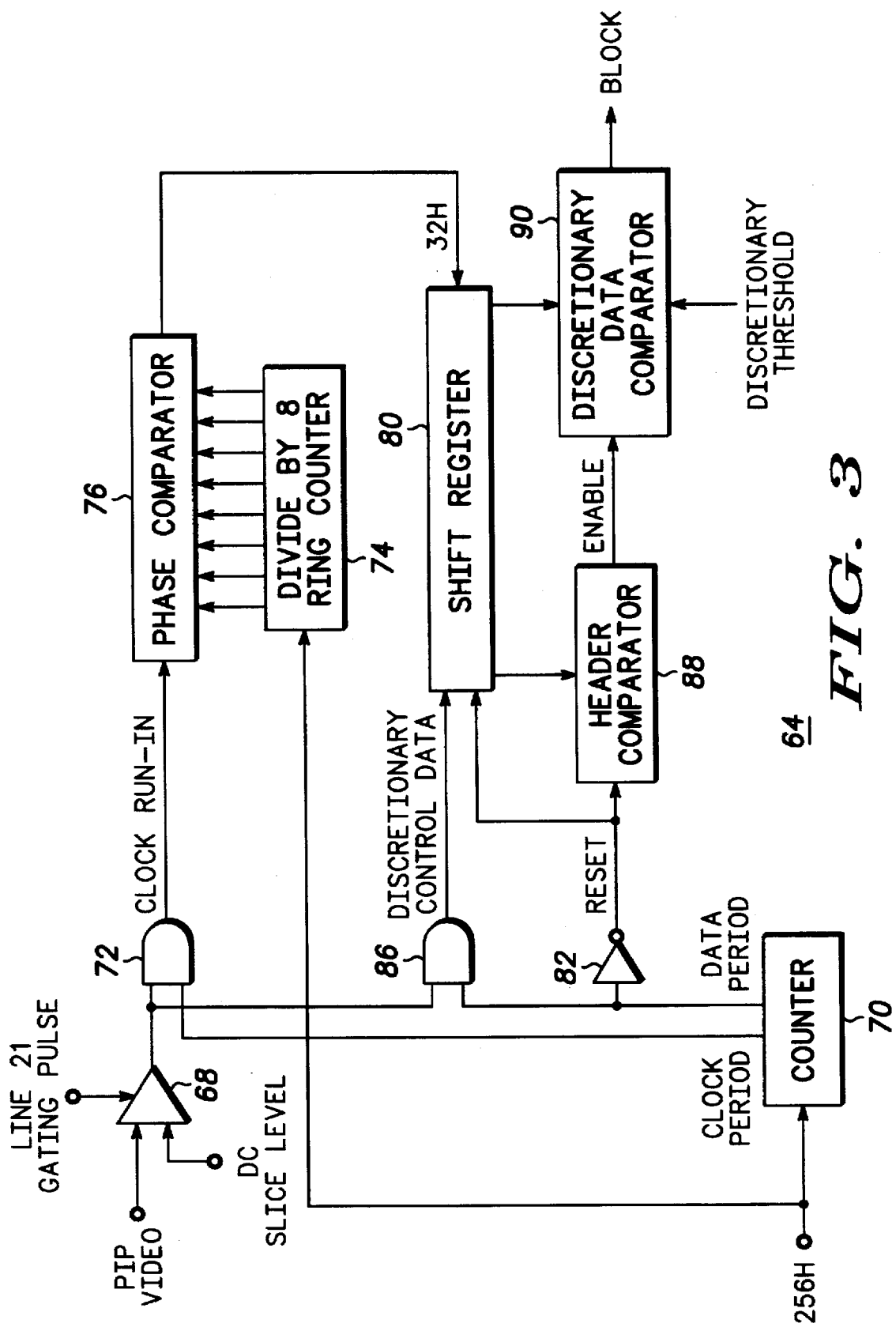
FIG. 3 is a block diagram of the discretionary control block shown in FIG. 2.
Figure 4:
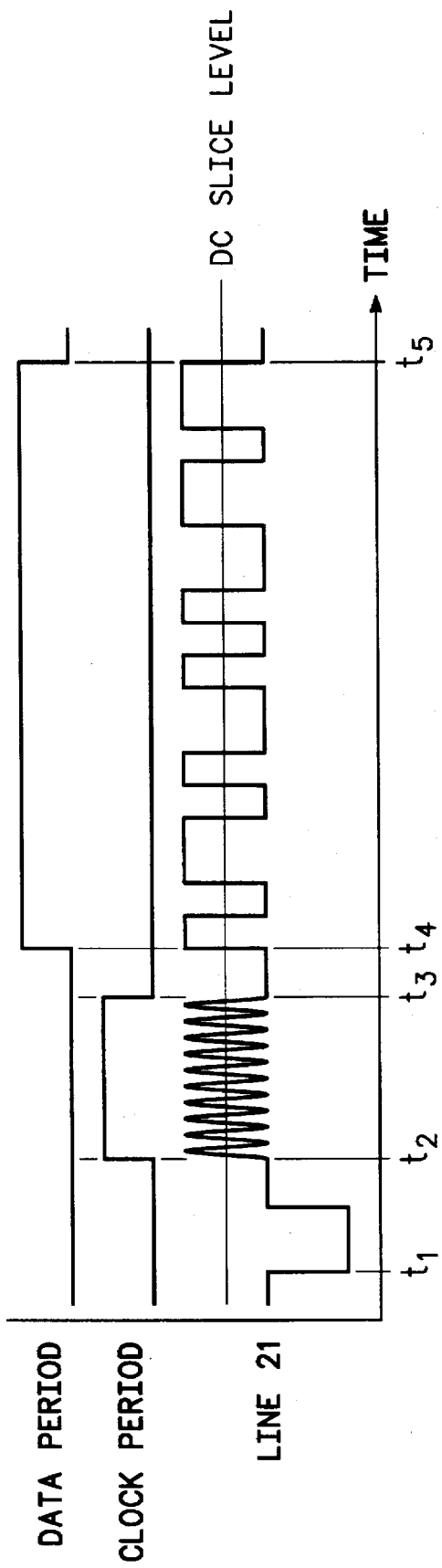
FIG. 4 is a waveform plot of line 21 data useful in explaining the present invention.

Further detail of discretionary control 64 is shown in FIG. 3. The PIP VIDEO signal is applied to one input of comparator 68. The second input of comparator 68 receives the DC SLICE LEVEL signal. Comparator 68 is enabled only during the time that the PIP VIDEO is presenting line 21 data. Again, a logic one line 21 gating pulse enables comparator 68 to perform a comparison between the PIP VIDEO signal and the DC SLICE LEVEL signal. The DC SLICE LEVEL is midway in the analog waveform. If the PIP VIDEO is greater than the DC SLICE LEVEL signal then the output of comparator 68 is logic one. If the PIP VIDEO is less than the DC SLICE LEVEL signal then the output of comparator 68 is logic zero. Thus, comparator 68 operates as a data slicer that converts the analog PIP VIDEO signal to conventional logic levels, e.g. CMOS logic levels. An example of the line 21 data is shown in FIG. 4. The line 21 data starts with a horizontal sync pulse at time $t_1$.

The line 21 data begins with a 32H sync clock burst operating at 32 times the horizontal line frequency between times $t_2$ and $t_3$. Counter 70 counts the number of pulses of the 256H clock signal. Counter 70 outputs a logic one CLOCK PERIOD signal between the counts of 43 and 95 as shown in FIG. 4 from time $t_2$ to time $t_3$. The logic one CLOCK PERIOD indicates that the 32H sync clock burst is active. Comparator 68 converts the 32H sync clock burst to CMOS logic levels. The output of comparator 68 is coupled to one input of AND gate 72, while its second input receives the CLOCK PERIOD. The CLOCK RUN-IN signal follows the output of comparator 68 during the active period of the 32H sync clock burst, i.e. when CLOCK PERIOD is logic one. The 256H clock signal also drives divide-by-8 ring counter 74. The output of counter 74 runs at 32 times the horizontal line frequency. Counter 74 provides a series of sixteen 8-bit output patterns each shifted in phase by 22.5 degrees with respect to each other. For example, the second 8-bit pattern is phase shifted 22.5 degrees from the first 8-bit pattern. Phase comparator 76 compares the CLOCK RUN-IN pattern with the sixteen patterns from counter 74 to find the closest match. The closest phase of the sixteen possible output of counter 74 to the CLOCK RUN-IN becomes the low frequency 32H CLOCK to a clock input of shift register 80. The 32H CLOCK synchronizes the clocking of shift register 80 to the mid-point of the discretionary control data between times $t_4$ and $t_5$ in FIG. 4. Shift register 80 can be implemented with a string of serially coupled D-type flipflops (not shown). The 32H CLOCK drives the clock inputs of the flipflops. The DATA signal described below is coupled to the data input of the first flipflop. The output of each subsequent flipflop is coupled to the input of the next flipflop. At time $t_3$ after the count of 95 by counter 70, CLOCK PERIOD returns to logic zero and disables CLOCK RUN-IN. However, counter 74 continues to provide the 32H CLOCK, that is most closely matched with the CLOCK RUN-IN signal, to shift register 80.

Counter 70 outputs a logic one DATA PERIOD signal between the counts of 111 and 196 as shown in FIG. 4 from time $t_4$ to time $t_5$. The logic one DATA PERIOD indicates that the discretionary control data is present in line 21. When DATA PERIOD first goes high, inverter 82 resets shift register 80 and header comparator 88 to a beginning state, e.g. all logic zeroes. Comparator 68 converts the discretionary control data to CMOS logic levels, e.g. "101101001010011011". The output of comparator 68 is coupled to one input of AND gate 86, while its second input receives the DATA PERIOD. The DISCRETIONARY CONTROL DATA signal follows the output of comparator 68 during the active period of the discretionary data, i.e. when DATA PERIOD is logic one. The DISCRETIONARY CONTROL DATA is shifted into shift register 80 in response to the 32H CLOCK. The first data bits in shift register 80 are passed to header comparator 88 for comparison against a predetermined header code indicating that the following data is discretionary control data. For example, a header code of "10110100" may indicating that the following data is discretionary control data.

Upon receiving the correct header code word, header comparator 88 enables discretionary data comparator 90. The data in shift register 80 following the header code word is passed to discretionary data comparator 90. A DISCRETIONARY THRESHOLD signal is pre-set by the parent or responsible person typically through the IR remote shown in FIG. 1. In one embodiment, the DISCRETIONARY THRESHOLD signal is provided over the IIC bus. Comparator 90 compares the 8-bit data in shift register 80, i.e. DISCRETIONARY CONTROL DATA, with the 8-bit DISCRETIONARY THRESHOLD. If DISCRETIONARY CONTROL DATA is less than DISCRETIONARY THRESHOLD then the amount and degree of sex and violence in the presently running program is considered acceptable. The BLOCK signal from comparator 90 is set to a logic zero so that logic 40 passes the compressed PIP image stored in memory 41 to DACs 43–46. PIP 22 process the PIP channel and the viewer is allowed to watch the program. If DISCRETIONARY CONTROL DATA is greater than the DISCRETIONARY THRESHOLD then the amount and degree of sex and violence in the presently running program is considered unacceptable. The BLOCK signal is set to a logic one so that logic 40 blocks the compressed PIP image stored in memory 41 from reaching DACs 43–46. A fixed logic state or color or pattern is sent to DACs 43–46. PIP 22 process the blank signal and makes the PIP channel unviewable.

By now it should be appreciated that the present invention provides an integrated circuit for processing baseband video signals to produce a picture-in-picture channel for a television screen. A discretionary control circuit on the integrated circuit monitors parental discretionary control data on a predetermined horizontal line of the baseband video signal. The discretionary control data is a value that represents the amount and degree of sex and violence in the presently viewed program. The parent or responsible party stores a threshold value in a television control circuit. The discretionary control circuit compares the discretionary control data to the threshold value. If the discretionary control data is less than the selectable threshold, then the PIP channel is displayed. If the discretionary control data is greater than the selectable threshold, then the PIP channel is blanked. The parental discretionary control function over the PIP channel, i.e. "V-chip" feature, is incorporated into the PIP IC. With the "V-chip" function as part of the PIP integrated circuit, the parent can blank-out the PIP channel within the PIP IC and prevent young people from viewing undesirable programs. The television system designer need not provide one or more additional "V-chip" integrated circuits dedicated to the discretionary control function over the PIP channel since that feature is an integral part of the PIP IC.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. An integrated circuit for providing discretionary viewing control over picture-in-picture (PIP) video data, comprising:

a PIP processing channel coupled for receiving a PIP video signal and providing a compressed video signal for display; and a discretionary control circuit coupled for receiving said PIP video signal and extracting discretionary control data from said PIP video signal, said discretionary control circuit comparing said discretionary control data with a discretionary threshold and providing a block signal to block said compressed video signal in said PIP processing channel when said discretionary control data exceeds said discretionary threshold.

2. The integrated circuit of claim 1 wherein said discretionary control circuit includes a data slicer that converts said PIP video signal to a digital video signal including said discretionary control data.

3. The integrated circuit of claim 2 wherein said discretionary control circuit further includes:

a counter operating in response to a high frequency clock that provides a clock period signal between first and second counts and provides a data period signal between third and fourth counts;

a first logic gate having a first input coupled for receiving said digital video signal, a second input coupled for receiving said data period signal, and an output for providing said discretionary control data;

a shift register having an input coupled to said output of said first logic gate for storing said discretionary control data; and a first comparator having a first input coupled to an output of said shift register and a second input coupled for receiving said discretionary threshold, said first comparator having an output that provides said block signal that blocks said compressed video signal in said PIP processing channel when said discretionary control data exceeds said discretionary threshold.

4. The integrated circuit of claim 3 wherein said discretionary control data is provided on a twenty-first line of said PIP video signal.

5. The integrated circuit of claim 4 wherein said data slicer includes a second comparator having a first input coupled for receiving said PIP video signal, a second input coupled for receiving a DC slice level signal having a level at a mid-point of said PIP video signal, an enable input coupled for receiving a gating pulse active during said twenty-first line of said PIP video signal, and an output for providing said digital video signal.

6. The integrated circuit of claim 5 wherein said discretionary control circuit further includes:

a second logic gate having a first input coupled for receiving said digital video signal, a second input coupled for receiving said clock period signal, and an output for providing a clock run-in signal;

a ring counter operating in response to said high frequency clock for providing a plurality of data words each respectively offset in phase; and a phase comparator having a first input coupled for receiving said clock run-in signal, a second input coupled to an output of said ring counter for serially receiving said plurality of data words, and an output for providing a low frequency clock having a phase that most closely matches said clock run-in signal, said low frequency clock being applied to a clock input of said shift register.

7. The integrated circuit of claim 1 wherein said PIP processing channel includes:

an input selector switch having a first input coupled for receiving a main video signal and a second input coupled for receiving said PIP video signal, said input selector switch selectively passing said main video signal and said PIP video signal to first and second outputs;

an analog-digital converter having an input coupled for receiving said PIP video signal and having an output for providing a PIP digital video signal;

a logic circuit coupled for receiving said PIP digital video signal, said logic circuit compressing said PIP digital video signal by weighted averaging to provide a compressed digital video signal; and a memory coupled to said logic circuit for storing and retrieving said compressed digital video signal.

8. The integrated circuit of claim 7 wherein said PIP processing channel further includes:

a digital-analog converter having an input coupled for receiving said compressed digital video signal following retrieval from said memory and having an output for providing said compressed video signal; and a PIP switch coupled for receiving said main video signal and said compressed video signal from said digital-analog converter for providing a composite main and PIP signal for display.

9. The integrated circuit of claim 8 wherein said logic circuit is responsive to said block signal for blocking said compressed digital video signal retrieved from said memory to prevent viewing of said PIP video signal.

10. An method of providing discretionary viewing control over picture-in-picture (PIP) video data, comprising the steps of:

processing a PIP video signal through a PIP processing channel for providing a compressed video signal for display;

extracting discretionary control data from said PIP video signal; and comparing said discretionary control data with a discretionary threshold and providing a block signal to block said compressed video signal in said PIP processing channel when said discretionary control data exceeds said discretionary threshold.

11. The method of claim 10 further including the step of converting said PIP video signal to a digital video signal including said discretionary control data.

12. The method of claim 11 further including the steps of:

counting a high frequency clock to provide a clock period signal between first and second counts and provides a data period signal between third and fourth counts;

gating said digital video signal with said data period signal for providing said discretionary control data; and storing said discretionary control data.

13. A television system comprising an integrated circuit for providing discretionary viewing control over picture-in-picture (PIP) video data, the integrated circuit comprising:

a PIP processing channel coupled for receiving a PIP video signal and providing a compressed video signal for display;

a data slicer that converts said PIP video signal to a digital video signal including discretionary control data;

a counter operating in response to a high frequency clock that provides a clock period signal between first and second counts and provides a data period signal between third and fourth counts;

a first logic gate having a first input coupled for receiving said digital video signal, a second input coupled for receiving said data period signal, and an output for providing said discretionary control data;

a shift register having an input coupled to said output of said first logic gate for storing said discretionary control data; and a first comparator having a first input coupled to an output of said shift register and a second input coupled for receiving a discretionary threshold, said first comparator having an output that provides a block signal that blocks said compressed video signal in said PIP processing channel when said discretionary control data exceeds said discretionary threshold.

14. The integrated circuit of claim 13 wherein said discretionary control data is provided on a twenty-first line of said PIP video signal.

15. The integrated circuit of claim 14 wherein said data slicer includes a second comparator having a first input coupled for receiving said PIP video signal, a second input coupled for receiving a DC slice level signal having a level at a mid-point of said PIP video signal, an enable input coupled for receiving a gating pulse active during said twenty-first line of said PIP video signal, and an output for providing said digital video signal.

16. The integrated circuit of claim 15 further including:

a second logic gate having a first input coupled for receiving said digital video signal, a second input coupled for receiving said clock period signal, and an output for providing a clock run-in signal;

a ring counter operating in response to said high frequency clock for providing a plurality of data words each respectively offset in phase; and a phase comparator having a first input coupled for receiving said clock run-in signal, a second input coupled to an output of said ring counter for serially receiving said plurality of data words, and an output for providing a low frequency clock having a phase that most closely matches said clock run-in signal, said low frequency clock being applied to a clock input of said shift register.

17. The integrated circuit of claim 13 wherein said PIP processing channel includes:

an input selector switch having a first input coupled for receiving a main video signal and a second input coupled for receiving said PIP video signal, said input selector switch selectively passing said main video signal and said PIP video signal to first and second outputs;

an analog-digital converter having an input coupled for receiving said PIP video signal and having an output for providing a PIP digital video signal;

a logic circuit coupled for receiving said PIP digital video signal, said logic circuit compressing said PIP digital video signal by weighted averaging to provide a compressed digital video signal; and a memory coupled to said logic circuit for storing and retrieving said compressed digital video signal.

18. The integrated circuit of claim 17 wherein said PIP processing channel further includes:

a digital-analog converter having an input coupled for receiving said compressed digital video signal following retrieval from said memory and having an output for providing said compressed video signal; and a PIP switch coupled for receiving said main video signal and said compressed video signal from said digital-analog converter for providing a composite main and PIP signal for display.

19. The integrated circuit of claim 18 wherein said logic circuit is responsive to said block signal for blocking said compressed digital video signal retrieved from said memory to prevent viewing of said PIP video signal.

\* \* \* \* \*